United States Patent
Ehrlich et al.

(10) Patent No.: US 6,598,078 B1
(45) Date of Patent: Jul. 22, 2003

(54) METHOD AND APPARATUS FOR GENERATING A RECORD FROM A TIME-MARKED INFORMATION STREAM

(75) Inventors: Jason Ehrlich, Pleasanton, CA (US); Rajeev D. Pitre, Cupertino, CA (US); David L. Burns, San Francisco, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/303,098

(22) Filed: Apr. 29, 1999

(51) Int. Cl.$^7$ ............................................. G06F 15/173
(52) U.S. Cl. ......................................... 709/224; 714/49
(58) Field of Search ................................. 709/223–224, 709/230, 236, 329; 714/45, 49, 51, 55; 379/265.01–265.14

(56) References Cited

U.S. PATENT DOCUMENTS

| | | | |
|---|---|---|---|
| 5,546,455 A | | 8/1996 | Joyce et al. |
| 5,691,917 A | * | 11/1997 | Harrison ........................ 717/6 |
| 5,745,753 A | * | 4/1998 | Mosher, Jr. .................. 707/202 |
| 5,884,328 A | * | 3/1999 | Mosher, Jr. .................. 707/202 |
| 5,958,009 A | * | 9/1999 | Friedrich et al. ........... 709/224 |
| 6,088,622 A | * | 7/2000 | Dollin et al. ................. 700/28 |
| 6,173,325 B1 | * | 1/2001 | Kukreja ........................ 709/224 |
| 6,236,723 B1 | * | 5/2001 | Fischer ................... 379/265.02 |
| 6,356,948 B1 | * | 3/2002 | Barnett et al. .............. 709/236 |
| 6,367,034 B1 | * | 4/2002 | Novik et al. .................... 714/39 |
| 6,370,161 B1 | * | 4/2002 | Ehrlich et al. ............... 370/516 |
| 6,418,467 B1 | * | 7/2002 | Schweitzer et al. ......... 709/223 |
| 6,442,269 B1 | * | 8/2002 | Ehrlich et al. ......... 379/265.03 |
| 6,453,345 B2 | * | 9/2002 | Trcka et al. ................. 709/224 |
| 6,453,346 B1 | * | 9/2002 | Garg et al. .................. 709/224 |
| 6,502,133 B1 | * | 12/2002 | Baulier et al. .............. 709/224 |

OTHER PUBLICATIONS

Microsoft Press Computer Dictionary, 3rd ed., Microsoft Press, p. 469, 1997.*

* cited by examiner

*Primary Examiner*—Andrew Caldwell
(74) *Attorney, Agent, or Firm*—Blakely, Sokoloff, Taylor & Zafman LLP

(57) ABSTRACT

A method of constructing a record utilizing information contained in an information stream sent from a detection device that monitors a transaction processing system, to a reporting device, commences with the detection of an expiration of a predetermined time interval with respect to the detection device. A time delimiter is then inserted into the information stream propagated from the detection device to the reporting device. The time delimiter indicates the expiration of predetermined time interval with respect to the detection device. Information derived from the instruction stream is assimilated into a record at the reporting entity. Time delimiters in the instruction stream are utilized to measure, at the reporting device, the expiration of the predetermined time interval at the detection device.

57 Claims, 14 Drawing Sheets

METHOD AND APPARATUS FOR GENERATING A RECORD FROM A TIME-MARKED INFORMATION STREAM

FIELD OF THE INVENTION

The present invention relates generally to the processing, storing and accessing of transaction information within a transaction processing system and, more specifically, to the communication of information between client and server software modules in a transaction processing environment.

BACKGROUND OF THE INVENTION

To provide efficient customer support responsive to customer requests receivable via, for example, a telephone network or the Internet, an enterprise may employ multiple transaction processing systems (e.g., ACDs, web servers, e-mail servers, workflow servers or network routers) within a customer support system. These multiple transaction processing systems may all be located at a single site (e.g., a call center) or may alternatively be distributed over multiple sites. In order to efficiently route such transactions (e.g., customer requests) to agents coupled to the multiple transaction processing systems in an efficient manner, it is advantageous for a transaction processing system manager to have a site-wide or an enterprise-wide view of transaction activity, regardless of the type of transaction processing system on which such activity occurs.

SUMMARY OF THE INVENTION

A method of constructing a record utilizing an information stream propagated between a detection entity, that monitors a transaction processing system and a reporting entity. The expiration of a predetermined time interval with respect to the detection entity is protected. A time delimiter is inserted into the information stream propagated between the detection entity and the reporting entity, the time delimiter indicating expiration of a predetermined time interval. Information is assimilated into the record at the reporting entity utilizing the time delimiter, the assimilated information being derived from the information stream.

Other features of the present invention will be apparent from the accompanying drawings and from the detailed description that follows.

BRIEF DESCRIPTION OF THE DRAWINGS

The present invention is illustrated by way of example in the following drawings in which like references indicate similar elements. The following drawings disclose various embodiments of the present invention for the purposes of illustration only, and are not intended to limit the scope of the invention.

DETAILED DESCRIPTION

A method and apparatus for generating a record from a time-marked information stream are described. In the following description, for the purposes of explanation, numerous specific details are set forth in order to provide a thorough understanding of the present invention. It will be evident, however, to one skilled in the art that the present invention may be practiced without these specific details.

Transaction Processing Environment Overview

Figure 1:
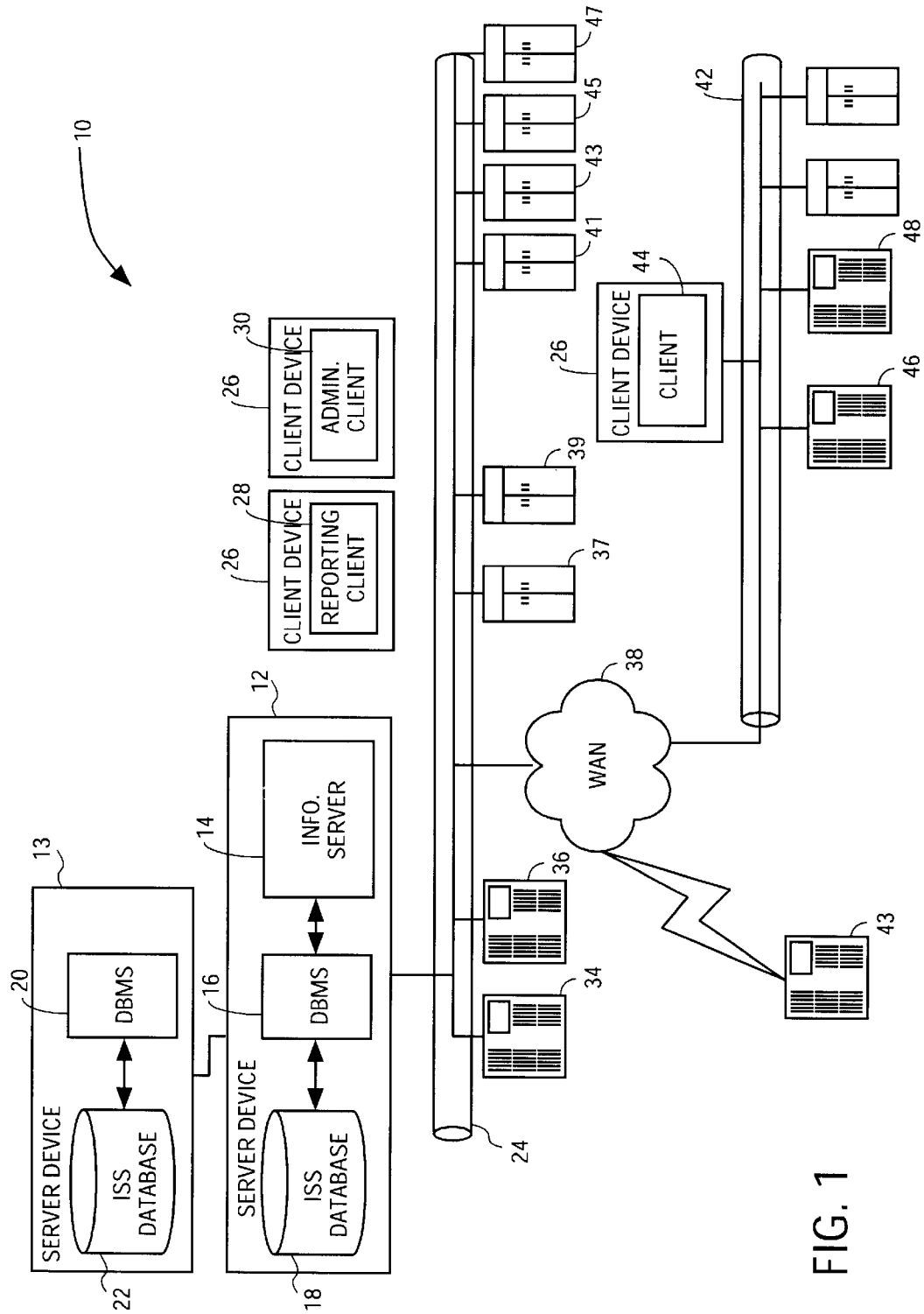
FIG. 1 is a diagrammatic representation of an exemplary transaction processing environment within which the present invention may be employed.

FIG. 1 is a diagrammatic representation of an exemplary transaction processing environmental within which the present invention may be employed. The transaction processing environment includes a server device 12 that hosts an information server 14 and a database management system (DBMS) 16. The information server 14 collects, processes, consolidates and provides access to near-real-time and historical transaction data generated by, and pertaining to, multiple transaction processing systems (e.g., ACDs, e-mail servers, web servers, Computer Telephony Integration (CTI) servers, and Interactive Voice Response (IVR) workflow servers, other workflow servers or network routers) and other devices, within the environment 10. The information server 14 accordingly functions as a framework for capturing, summarizing and storing such transaction data from multiple sources, as will be described below.

The DBMS 16 may, for example, be the Oracle8 Server developed by Oracle Corp. of Redwood City, Calif., or the Sybase SQL Server developed by Sybase, Inc. of Emeryville, Calif., and comprises a collection of programs that maintain and facilitate access to an Information Server Software (ISS) database 18. The database 18 constitutes information (e.g., both data and metadata) regarding resource configurations, transactions and other environment parameters, conditions and functions (e.g., call, agent and trunk events, fact records and summaries). A mirror server device 13, in one exemplary configuration, hosts a replicated DBMS 20 that may be implemented using the Oracle Advanced Replication Server, and that maintains and facilitate access to a replicated ISS database 22. The replicated DBMS 20 may be utilized as a standby or redundant system, or to generate historical reports. In an alternative configuration, the information server 14 may reside on the server device 12, and the DBMS 16 may reside on the server device 13 to facilitate off-board performance gains as the resources of the server device 12 are devoted exclusively to the information server 14.

The server device 12 is coupled by a Local Area Network (LAN) 24 to network devices 26, each of which hosts a software client. Of course, in an alternative embodiment, the LAN 24 may replaced by any network type, such as for example a Wide Area Network (WAN). The software clients may include a reporting client 28 and an administrative client 30. The reporting client 28 may be any Open Database Connectivity (ODBC) compliant application, and makes queries against the database 18, and formats the results of these queries based on a predefined set of instructions (i.e., a report definition). The reporting client 28 may further include a scheduler for scheduling reports to run at predetermined times. The administrative client 30 maybe a Microsoft Foundation Class (MFC) 4.0 application, and could accordingly reside on a Windows 95, Windows NT workstation or Windows NT Server platform. The administrative client 30 facilitates configuration and management of the information server 14 on the server device 12. For example, utilizing a graphical user interface (GUI) provided by the administrative client 30, a system administrator may define data sources, set data destinations, specify rules, formulas and frequencies for data summaries, view server system metadata information, events, and task statuses. The administrative client 30 communicates with server components of the information server 14 through an Application Program Interface (API) that makes use of Remote Procedure Call (RPC) to facilitate remote management of the information server 14 over the LAN 24 or over a Wide Area Network (WAN) 38.

Also coupled to the LAN 24 (or a WAN in an alternative embodiment) are a pair of transaction processing systems in the exemplary forms of Automatic Call Distributors (ACDs) 34 and 36, a workflow server 37, a network router 39, a CTI server 41, an IVR server 43, an e-mail server 45, and a web server 47. Each of the ACDs 34 and 36 may be the Aspect® ACD System manufactured by Aspect Telecommunications Corp. of San Jose, Calif. Each of the ACDs 34 and 36 is typically coupled to a Public Switched Telephone Network (PSTN) (not shown) via which the respective ACDs may receive transaction requests (e.g., phone calls from telephone units, such as those used in homes or businesses). Each of the ACDs 34 and 36 may also be coupled to the Internet, an Intranet, or any other network over which a transaction may be initiated. Also coupled to each of the ACDs 34 and 36 are a number of network devices (not shown) in the form of agent computers or telephone units via which human agents and/or software agents interact with a respective ACD and with customers.

The WAN 38 couples the LAN 24 to a remote LAN 42 and to a further ACD 34. A network device 26, and a further pair of ACDs 46 and 48 (or other transaction processing systems), are coupled to the remote LAN 42.

It will be appreciated that, in order to configure all transaction processing systems within the transaction processing environment 10 to handle customer requests and transactions efficiently, it would be advantageous to provide the system administrator with an enterprise-wide view of transaction activity that is occurring on all transaction processing systems within the environment 10. Similarly, in a single site deployment of multiple transaction processing systems, it is advantageous for the system administrator to have a site-wide view of transaction activity. Specifically, such site-wide or enterprise-wide views of transaction activity provide a system administration with information required to schedule, compensated, review and allocate agents so as to increase customer satisfaction (e.g., by reducing customer wait time). Further, such site-wide or enterprise-wide views facilitate improved call processing and call routing across the entire site or enterprise, and also provide business and business component information that may be utilized to refine business models practices.

Data Path

Figure 2:
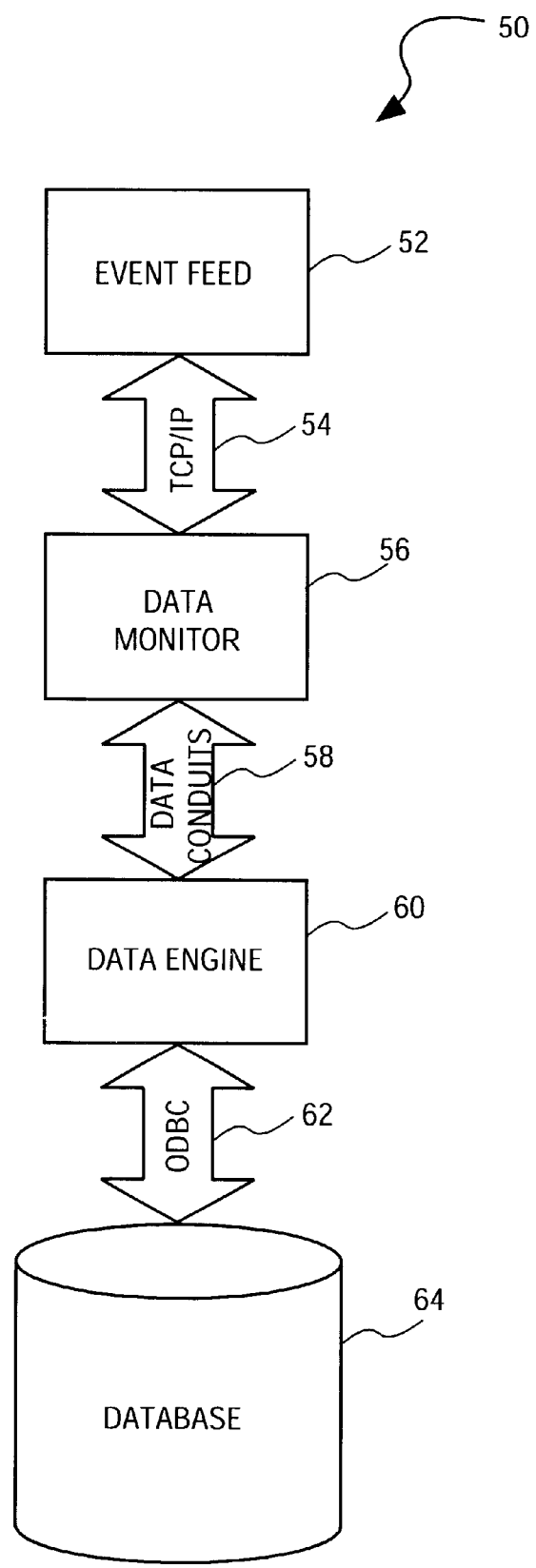
FIG. 2 is a block diagram showing a data path, according to an exemplary embodiment, implemented within the transaction processing environment shown in FIG. 1.

FIG. 2 is a block diagram showing a data path 50, according to one exemplary embodiment of the present invention, implemented within the transaction processing environment 10. The data path 50 begins with an event feed 52, which may be TCP/IP based. Specifically, an event feed 52 may facilitate the supply of data from a transaction processing system (e.g., an ACD or other server) to the information server 14, concerning transaction processing system activity. The event feed 52 may be implemented by an event feed server (hosted on a transaction processing system) that supplies an event feed client within the information server 14 (hosted on the server device 12) with, merely for example, transaction detail records, daily summaries, or information regarding agent, call, trunk or configuration events. The event feed server is responsible for gathering unprocessed transaction data from the various transaction processing subsystems of a transaction process system, and for the feeding of this transaction data to the event feed client. The event feed server also provides a fault tolerant link, for example utilizing the Remote Procedure Call (RPC) protocol, between the event feeder server and event feed client, and handles backup and online re-synchronization functions.

A data monitor 56 processes both data and configuration messages received from the event feed 52 via a Transmission Control Protocol/Internet Protocol (TCP/IP) connection 54. Specifically, the data monitor 56 may transform the unprocessed transaction data received from the event feed 52 into "fact records" (e.g., call fact records, trunk fact records and agent fact records). From the data monitor 56, fact records are propagated via data conduits 58 to a data engine 60 that buffers and summarizes the fact records, and performs block writes of records into a database 64 utilizing the Open DataBase Connectivity (ODBC) protocol, as indicated at 62. The use of the ODBC protocol provides portability to other databases.

Figure 3:
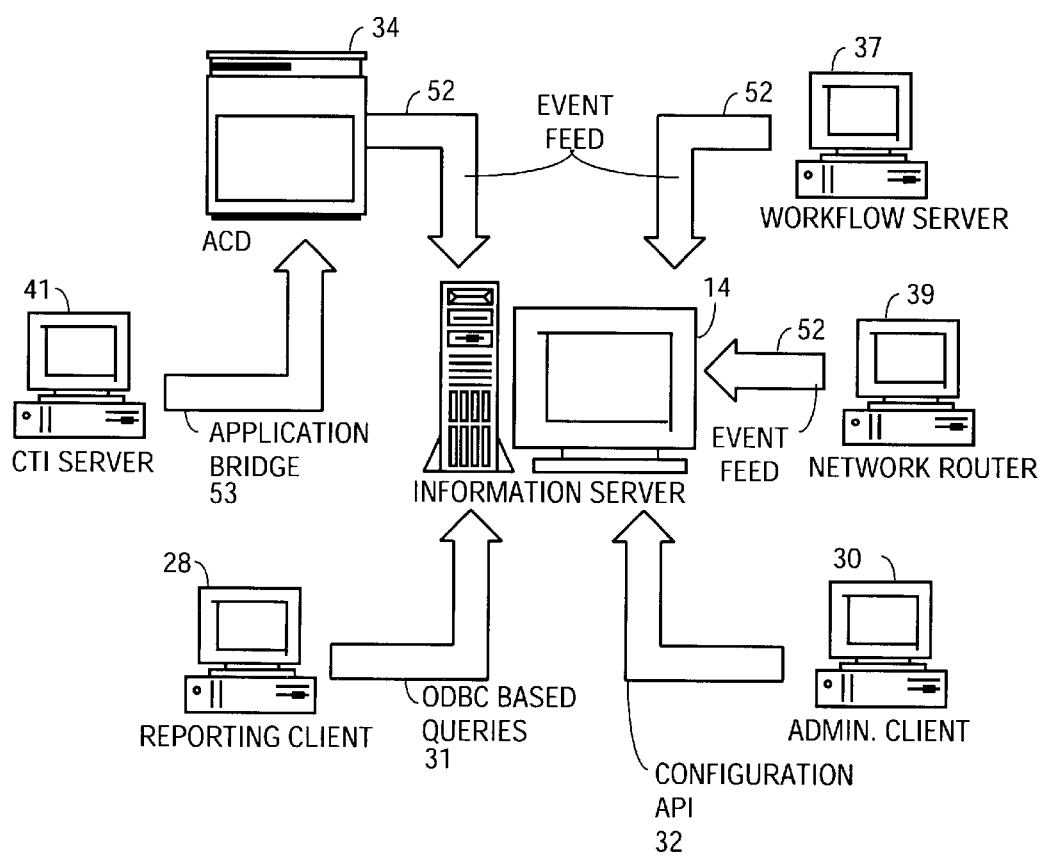
FIG. 3 is a diagrammatic representation of transaction processing systems, according to an exemplary embodiment of the present invention, within a transaction processing environment that provide input to an information server.

FIG. 3 is a diagrammatic representation of exemplary transaction processing systems within a transaction processing environment 10 that may provide input to an information server 14. FIG. 3 illustrates, at a conceptual level, how respective event feeds 52, as well as other mechanisms and protocols, contribute to the supply data to the information server 14. For example, respective event feeds 52 are shown to provide transaction data from the ACD 34, the workflow server 37 and the network router 39 to the information server 14. The administrative client 30 is shown to provide input to the information server 14 via an Application Program Interface (API) 32, while the reporting client 28 is shown to propagate ODBC-based queries 31 to the information server 14. Finally, the CTI server 41 is shown to communicate with the ACDs 34 via a customized application bridge 53.

The Information Server-Overview

Figure 4:
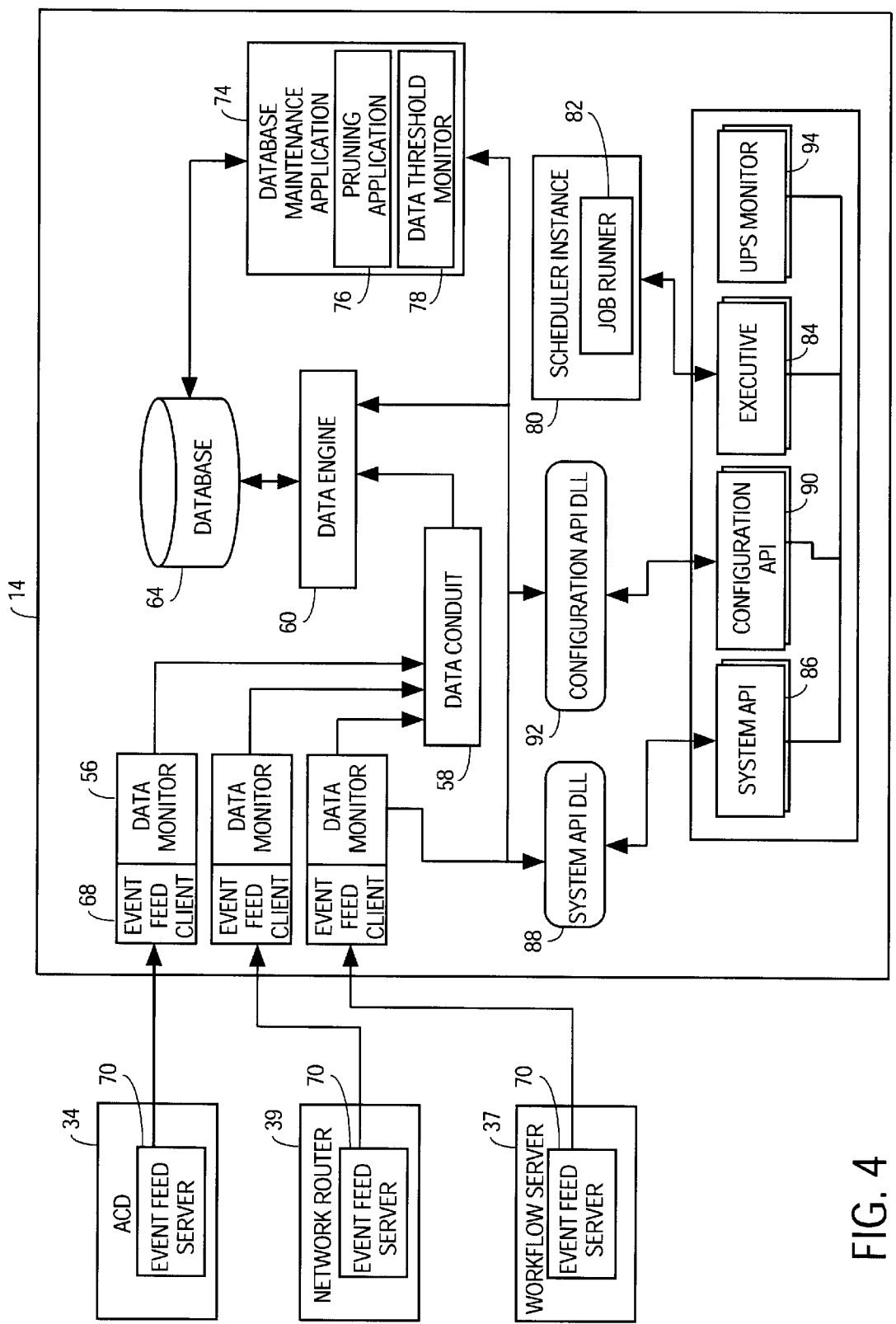
FIG. 4 is a block diagram illustrating the architecture of an information server, according to an exemplary embodiment of the present invention, hosted on a server device.

FIG. 4 is a block diagram illustrating the architecture of an exemplary information server 14 hosted on the server device 12. The information server 14 includes a number of event feed clients 68, each of which receives unprocessed transaction information from an associated event feed server 70 hosted on a respective transaction processing system. In one embodiment, a number of separate event feed server-client pairs are provided to facilitate the provision of unprocessed transaction information to the information server 14 from different types of transaction processing systems that may implement different event reporting protocols. For example, a first event feed server-client pair may be utilized to provide unprocessed transaction information to the information server 14 from an ACD 34 from a specific manufacturer, a second event feed server-client pair may be utilized to provide unprocessed transaction information to the information server 14 from a network router 39, and a third event feed server-client pair may be utilized to provide unprocessed transaction information to the information server 14 from a workflow server 37. Further event feed server-client pairs may be utilized to provide information to the information server 14 from other devices or information resources.

In one exemplary embodiment of the present invention, an event feed server-client pair servicing an ACD 34 collects and buffers information concerning call events, agent events, trunk events and database events. Tables 1–3 below provide examples of call events, agent events, and trunk events respectively that cause an event feed server 70, hosted on an exemplary ACD 34, to send a message concerning the event to an associated event feed client 68 within the information server 14:

TABLE 1

| EVENT | DESCRIPTION |
| --- | --- |
| Call Noticed | The ACD first notices the presence of a call |
| Call Offered | A call is offered to a teleset and the teleset starts to ring |
| Call Disconnected | A call is disconnected |
| Call Held | A call is put on hold |
| Call Retrieved | A call is retrieved after being on hold |
| Call Transferred | A call is transferred to another agent or IVR |
| Call Conferenced | An agent enters a conference call |

TABLE 2

| EVENT | DESCRIPTION |
| --- | --- |
| Agent Logged On | An agent signs on to a teleset |
| Agent Logged Off | An agent signs off |
| Agent Idle | An agent pushes the idle button |

TABLE 2-continued

| EVENT | DESCRIPTION |
| --- | --- |
| Agent Available | An agent pushes the available button |
| Agent Wrap-Up | An agent is performing after-call work |
| Agent Reserved | An agent is put on reserved state to prepare for a call |
| Agent Makes Outbound | Agent begins an outbound call |
| Agent Makes Inside | Agent makes an inside call |
| Resource Released | An agent or other resource is released |

TABLE 3

| EVENT | DESCRIPTION |
| --- | --- |
| Trunk Seized | A trunk is selected and reserved for an outbound call |
| Resource Released | A trunk or other resource is released |

Database events which may cause an event feed server 70 hosted on an ACD 34 to send a database event message to an associated event feed client 68 include additions, deletions or other updates to a specific table within the ACD 34.

Other messages sent by an event feed server 70 hosted on an ACD 34 might include time strobe messages and keep-alive messages. Time strobe messages are sent at the end of predetermined time intervals (e.g., one minute intervals), the time strobe messages guaranteeing to an associated event feed client 68 that the event feed server 70 will send no further event messages within a specific and predetermined time interval. Keep-alive messages are sent periodically to monitor the status of a connection between the ACD 34 and the information server 14.

An event feed server-client pair servicing a network router 39, in one exemplary embodiment, generate route data records for the relevant network router 39. Each route data record may be assembled utilizing two messages propagated from the event feed server 70 to the event feed client 68. A first message contains information regarding an initial transaction request and a second message contains information regarding how the network router handled the transaction request. The event feed client 68 assembles these two messages into a single route data record that is available for storage and summarization. The event feed server 70 of a network router 39 may also send a number of database event messages to an event feed client 68, the database event messages corresponding substantially to those propagated by the event feed client of an ACD 34.

An event feed server-time servicing a workflow server 37, in one exemplary embodiment, may utilize workflow data messages, in addition to time strobes, to communicate information to the information server 14. For purposes of the present specification, the term "workflow" shall be taken to refer to any predetermined sequence of steps that are performed by a transaction processing system in the processing of a transaction. For example, each execution of a workflow by a workflow server may generate a workflow message, containing information regarding the workflow and a specific execution instance.

Each event feed client 68 is associated with a respective data monitor 56, each data monitor 56 propagating fact records to a data engine 60 via a data conduit 58. From the data engine 60, summarized transaction information is written to the database 64 utilizing the ODBC protocol 62. The data conduit 58, as will be described in further detail below, operates to facilitate communication between, in one exemplary embodiment, (1) the data engine 60 and custom applications which may.be implemented within the information server 14, and (2) the data monitors 56, each of which may be associated with an external transaction processing system. To this end, the data conduit 58 includes a set of functions that may be exported to custom applications within the information server 14. For example, the functions exported from the data conduit 58 may allow an application to allocate and free shared memory record structures, pass shared memory record structures between applications, define records of interest, and read the form (or catalog) of a memory record structure. Specifically, utilizing the appropriate function, an application may read the number of fields, type and name of each field, and ordinal of each field within a memory record structure (or table).

The information server 14 further includes database maintenance applications 74 that include two primary applications, namely a pruning application 76, and a data threshold monitor 78 that together operate to maintain the data space usage within the database 64 within predefined boundaries, thereby preventing data space overflows. The pruning application 76 is responsible for pruning database tables within the database 64, and is launched by an executive model, that may be triggered by a scheduler instance 80 associated with a schedule event (or schedule entry). The data threshold monitor 78 provides a system Application Program Interface (API) for implementing and decrementing row counters for tables within the database 64. The data threshold monitor 78 furthermore launches the pruning application 76 when a table within the database 64 exceeds a predetermined threshold number of rows.

A scheduler instance 80 typically schedules "jobs" or application tasks within the information server 14 on hourly, daily, weekly or monthly schedules. To this end, a scheduler instance 80 may include a "job runner" application 82 that, in one exemplary embodiment, is launched by the Windows NT schedule service, and that coordinates with the executive module 84 to execute each job within the job group associated with a schedule entry. The job runner application 82 furthermore calls a system API from a system API module 86 via the system API Dynamic Link Library (DLL) 88 to schedule the next time at which the job runner application 82 should be launched to process a respective schedule entry.

The executive module 84 exercises control over the various software applications within the information server 14, such as the data monitors 56, the data engine 60 and possibly other custom applications. The executive module 84 is responsible for the start-up and shutdown of the software applications and, to this end, issues START and STOP control messages to the various applications. The executive module 84 also issues ADD and REMOVE conduit service messages to establish and tear down conduits between various applications. A configuration API module 90 is a Remote Procedure Call (RPC)-based set of functions that may be exported to various applications via a configuration API DLL 92. For example, the functions exported from the configuration API module 90 may allow an application to (1) enumerated, create, delete, read or write configuration metadata read from the database 64, and also to (2) start and stop other applications, such as a data monitor 56 and the data engine 60. A system API module 86 similarly is an RPC-based set of functions that may be exported to various applications via the system API DLL 88. For example, the functions exported from the system API module 86 may allow an application to request data feeds from other applications, and to add, delete and update data source supplied configuration data, such as user, group or application configuration data. Further exported functions may allow an application to log events in a system event log, and to increment and decrement database threshold counters.

The information server 14 also includes an Uninterruptible Power Supply (UPS) monitor 94 that monitors UPS messages sent by, for example, a Windows NT® UPS service. The UPS monitor 94 then coordinates with the executive module 84 to shutdown appropriate parts of the information server 14.

Server Side Architecture

Figure 5:
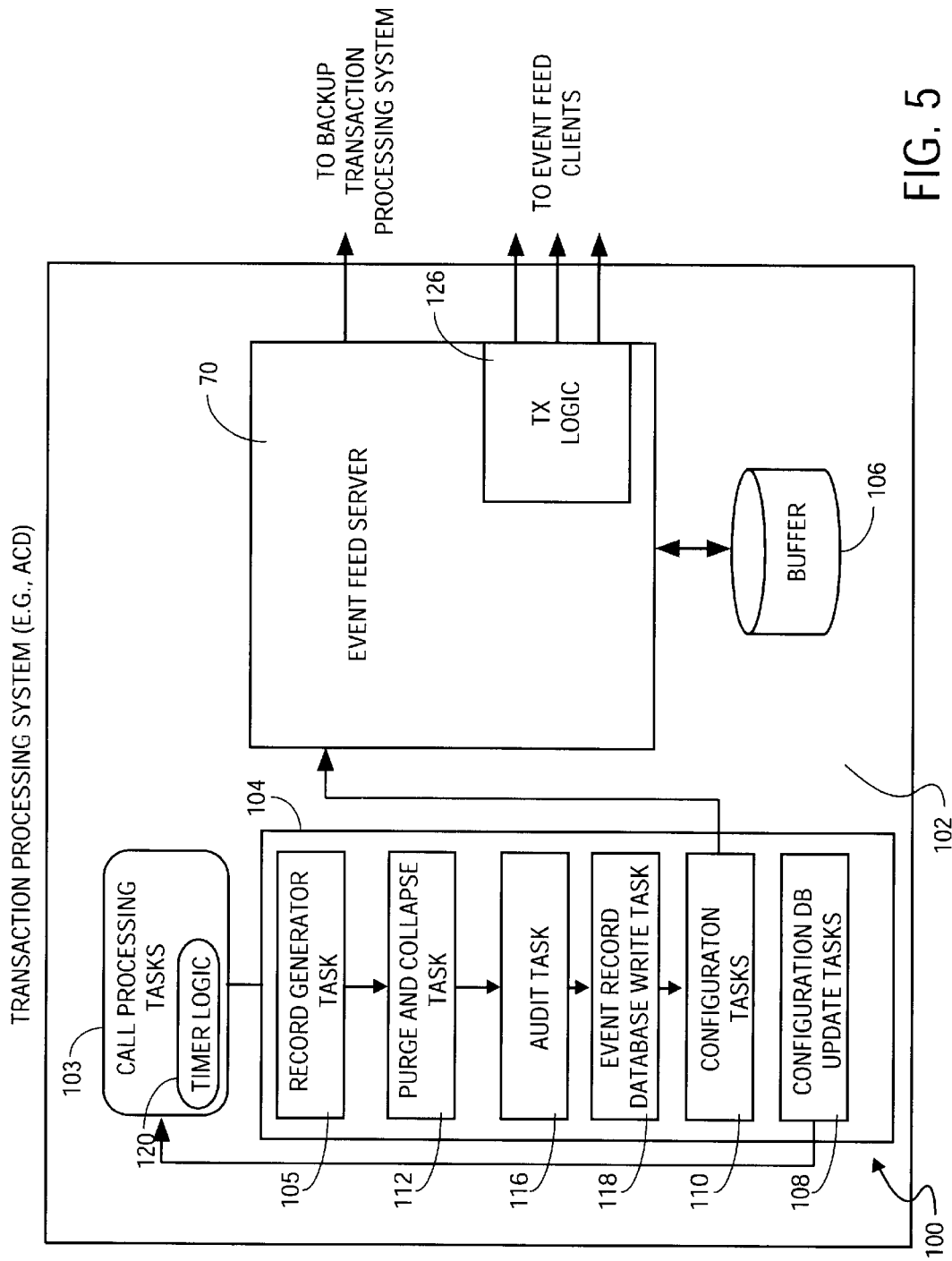
FIG. 5 is a block diagram illustrating the architecture of server side software, according to an exemplary embodiment of the present invention, that may be hosted on a transaction processing system.

FIG. 5 is a block diagram illustrating the architecture of server side software 100, according to an exemplary embodiment of the present invention, that may be hosted on a transaction processing system 102, such as any one of those detailed above. The server side software 100 is shown to include an event feed server 70, call processing tasks 103 and a collection of reporting tasks 104.

The call processing tasks 103 operate to perform well-known call processing operations within the transaction processing system 102. These operations may correspond to a number of the events listed above in Tables 1–3. For example, the call processing tasks 103 may monitor the availability and indicated allocations of agents that the transaction processing system 102 services, and allocate incoming or outgoing calls to agents. The call processing tasks 103 are also shown to include timer logic 120 that outputs a continuous time indication to the record generator task 105.

The record generator task 105 of the reporting tasks 104 is responsible for creating records that document the various operations performed by the call processing tasks 103. To this end, the record generator task 105 receives messages from the call processing tasks 103, and updates a shared memory within the transaction processing system 102 to reflect the current state of resources of the transaction processing system 102 and of transactions currently being processed by the transaction processing system 102. Merely for example, where the transaction processing system 102 is an ACD, the call processing tasks 103 may propagate a message to the record generator task 105 to indicate that an agent has transitioned from an available state to an idle state. The record generator task 105 updates the shared memory to reflect this event occurrence.

As mentioned above, the record generator task 105 receives a continuous time indication from the timer logic 120, and utilizes this time indication to "time stamp" all records and messages generated thereby.

The other reporting tasks 104, inter alia, function to process and forward messages received from the record generator task 105 responsive to operations performed by the call processing tasks 103. The reporting tasks 104 also collect and write event information concerning agents, calls and trunks to a database 106, and perform maintenance functions with respect to the database 106. Each of the other exemplary reporting tasks 104 will now briefly be described.

A purge and collapse task 112 performs purge and collapse functions with respect to the database 106. Specifically, the task 112 may purge or remove records from the database tables within the database 106 that are older than a predetermined specified age. The task 12 may furthermore collapse or summarize the data within the database 106 by summarizing information within specific detailed tables, generating summary records, and recording these summary records within summary tables.

An audit task 116 collects information regarding access events with respect to the transaction processing system 102, and writes this access information to the database 106. This access information is utilized primarily for security purposes.

An event recorded database write task 114 performs the primary function of writing event information, regarding call, agent and trunk events, into appropriate records within the database 106.

Configuration tasks 110 create records that specify the configuration of the transaction processing systems 102 (e.g., work flow specifications and agent characteristic specifications.

A configuration database updated task 108 performs update operations on configuration records within the database 106. The record generator task 105 also operates to generate a time strobe message 190 (discussed in further detail below) at predetermined time intervals as measured at the transaction processing system 102 by the timer logic 120. For example, the record generator task 105 may generate a time strobe message 190 every three seconds. The record generator task 105 includes the time strobe messages 190 in a sequence or stream of messages propagated therefrom to the reporting tasks 104.

Messages are then propagated from the configuration tasks 110 to the event feed server 70, from where the messages are transmitted, utilizing transmit logic 126, to client side software residing within the information server 14.

Client Side Architecture

Figure 6:
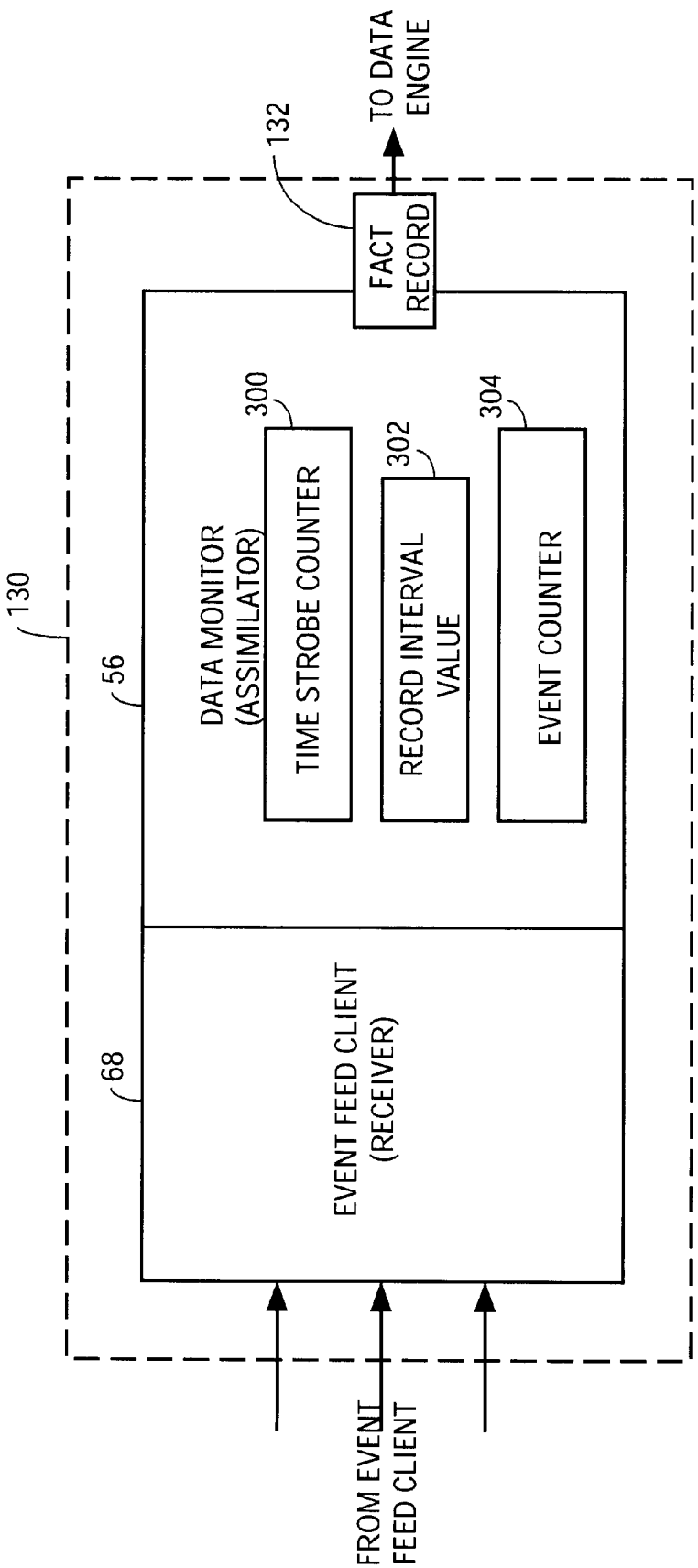
FIG. 6 is a block diagram illustrating the architecture of server side software, according to an exemplary embodiment of the present invention, that may be incorporated within an information server, such as that shown in FIG. 4.

FIG. 6 is a block diagram illustrating the architecture of server side software 130, according to an exemplary embodiment of the present invention, that may be incorporated within the information server 14, shown in FIG. 4. The client side software 130 is shown to comprise a receiver in the exemplary form of an event feed client 68 and an assimilator in the exemplary form of a data monitor 56. The event feed client 68 receives time strobe messages and time-stamped control and data messages from the server side software 100. The data monitor 56 processes and assimilates information embodied in the received control and data messages, and constructs fact records 132 utilizing the processed and assimilated information, as will be described in detail below. The data monitor 56 event propagates these fact records 132 to the data engine 35 of the information server 14.

Message Types

Figure 7:
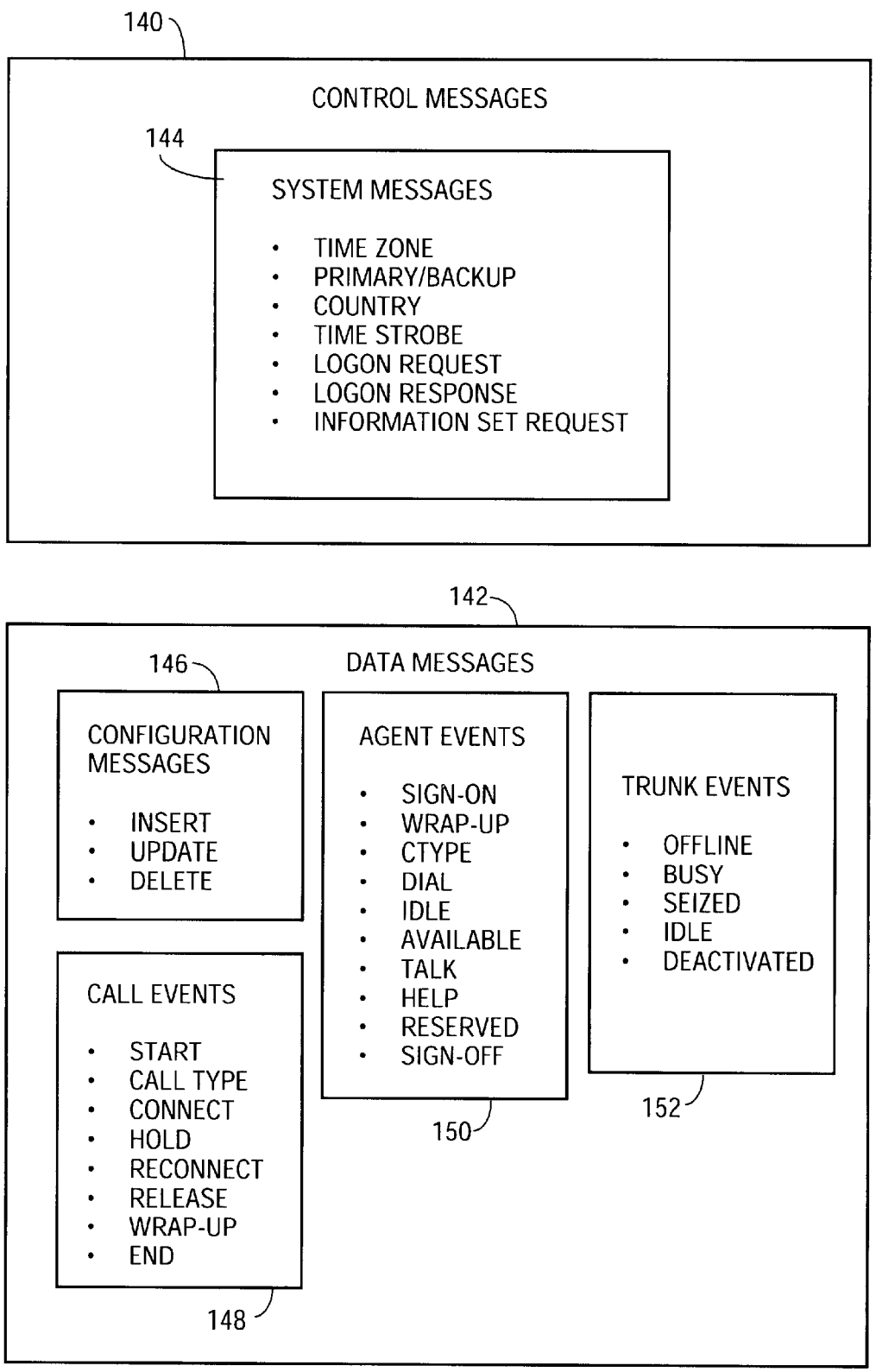
FIG. 7 is a block diagram illustrating various messages types, according to an exemplary embodiment of the present invention, that may be propagated from an event feed server to an event client responsive to messages received from various reporting tasks.

FIG. 7 is a block diagram illustrating the various message types, according to an exemplary embodiment of the present invention, that are propagated from the event feed server 70 to the event feed client 68, responsive to messages received from the reporting tasks 104 and the record generator 105. The messages may broadly be classified as either being control messages 140 or data messages 142. The control messages 140 include system messages 144 that indicate the time zone and country within which the transaction processing system 102 is operating, and time strobe messages. The data messages 142 may be more narrowly classified as being configuration messages 146, call event messages 148, agent event messages 150, or trunk event messages 152. Exemplary configuration messages 146 included messages indicating a component of the transaction processing system 102 has been inserted, removed or updated. The call event messages 148 may be generated for each of the call events listed above in Table 1, such as a call being connected, disconnected, held, retrieved, or transferred. The agent event messages 150 may be generated for each of the agent events listed above Table 2, such as an agent logging on, logging off, going idle, becoming available or being reserved. The trunk event messages 152 may be generated for each of the trunk events listed above in Table 3, such as a trunk being seized, released, idle or de-activated.

Message Communication and Time Strobe Messages

Figure 8:
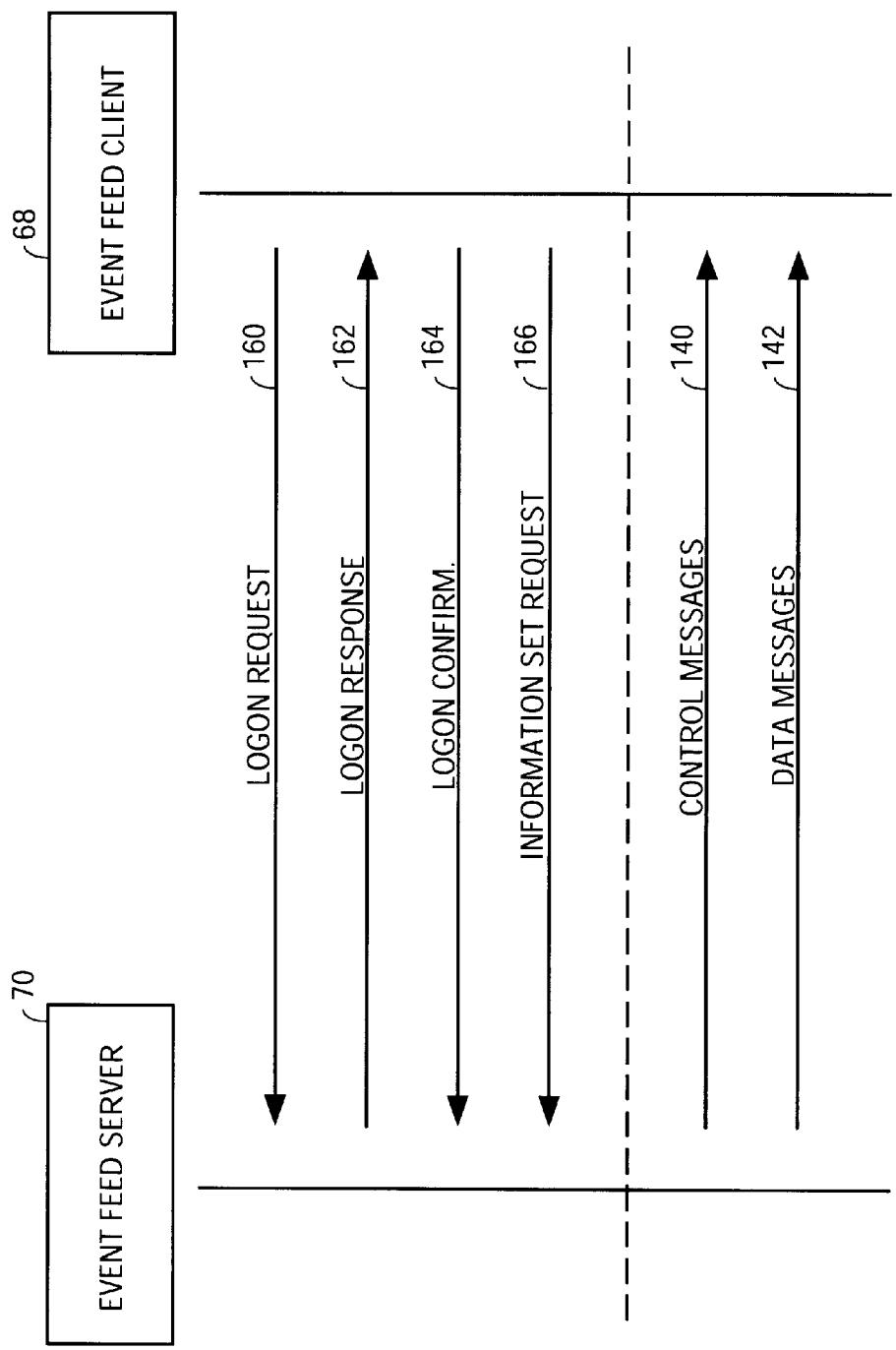
FIG. 8 is a diagrammatic representation of a log on sequence and subsequent data communications, according to an exemplary embodiment of the present invention, that may occur between an event feed server and an associated event feed client.

FIG. 8 is a diagrammatic representation of the logon sequence and subsequent data communication that occurs between the event feed server 70 and an associated event feed client 68. As illustrated, the client 68 propagates a logon request 160 to the event feed server 70, to which the event feed server 70 responds with a logon response 162. The event feed client 68 propagates a logon confirm message 164, followed by an information set request 166, which specifies the information, regarding the transaction processing system 102 hosting the event feed server 70, in which the information server 14 is interested for the purposes of generating fact records. For example, the information set request 166 may specify that the event feed client 68 wishes to receive call event messages 148 indicating when calls are connected and disconnected, but does not wish to receive call event messages indicating that a call has been conferenced or transferred. A system administrator, utilizing the administrative client 30 illustrated FIG. 1, typically specifies the information set request 166. No time strobe messages are communicated from the event feed server 70 to the event feed client 68 during propagation of the messages 135–166. Following the logon sequence, control and data messages 140 and 142 are then propagated, from the event feed server 70 to the event feed client 68 responsive to event occurrences or at scheduled time intervals. As mentioned above, the control messages 140 include time strobe messages that are generated by the record generator task 105 at regular time intervals to provide a temporal reference, with respect to the transaction processing system 102, to the event feed client 68.

Figure 9:
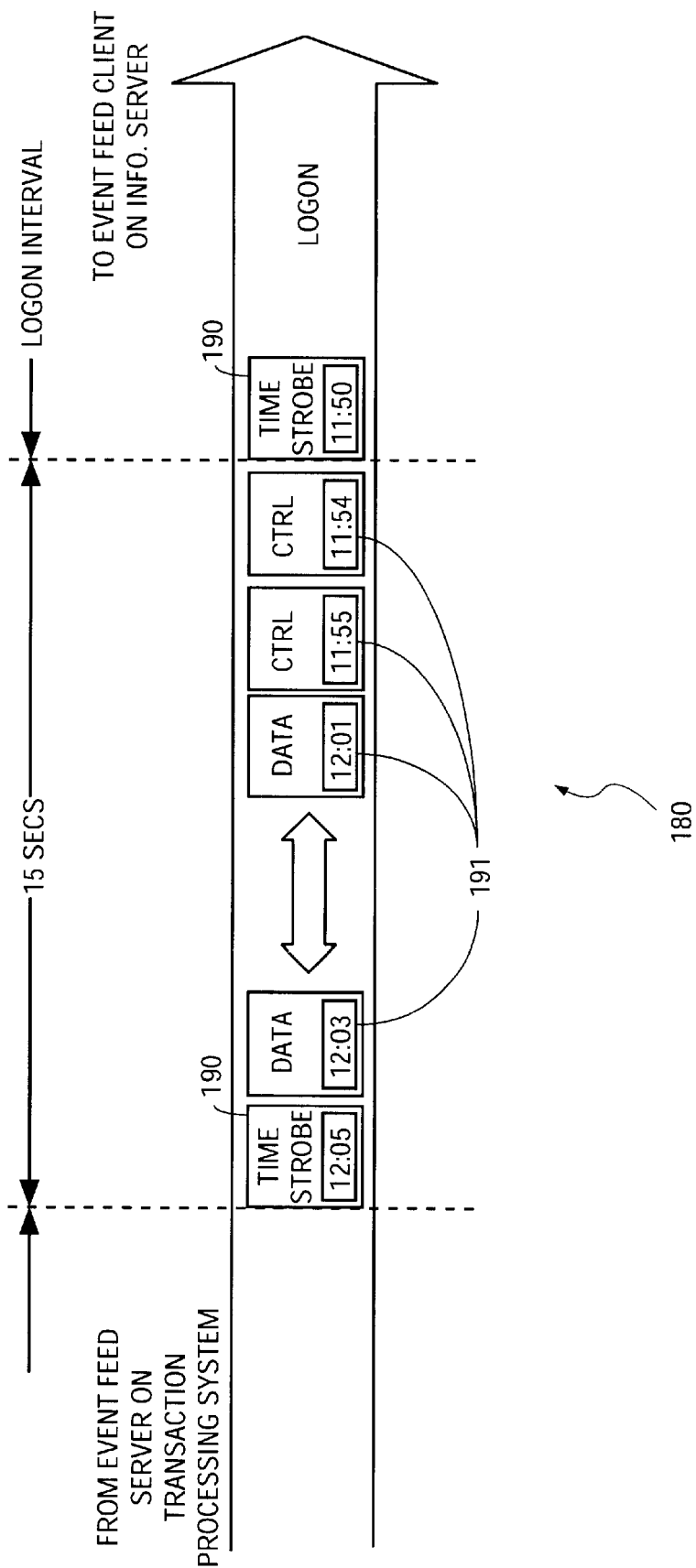
FIG. 9 is a diagrammatic representation of an information stream, according to an exemplary embodiment of the present invention, that may be established between an event feed server and an event feed client.

FIG. 9 is a diagrammatic representation of an information stream 180, according to an exemplary embodiment of the present invention, that may be established between an event feed server 70 and an event feed client 68. The information stream 180 comprises two-way traffic, namely a first stream portion 182 propagated from the server 70 to the client 68, and a second stream portion (not shown) propagated from the client 68 to the server 70. In order to clarify the illustration provided in FIG. 9, the logon request 160, the logon response 162, the logon confirm 164 and the information set request 166 are not shown in this diagram. As described above with reference to FIG. 8, the control and data messages 140 and 142 are included in the stream portion 182 propagated from the server 70 to the client 68. Each of the control and data messages 140 and 142 includes a time stamp 191, determined by the record generator task 105 utilizing a time indication from the time logic 120, that marks the relevant message as being either associated with an event that occurred at a particular time at the transaction processing system 102, or as including data valid (or measured/polled data) at a particular time at the transaction processing system 102. The time stamp 191 included within each of the messages 140 and 142 may be a time indication relative to an internal time "anchor" established by the timer logic 120 with respect to the transaction processing system 102, or may simply be an indication of a certain time of the day.

As shown, the information stream 180 includes time strobe messages 190, as originally generated by the record generator task 105, which demarcate specific time intervals in the information stream 180. The information stream 180 may be time marked by the insertion of discrete and dedicated time strobe messages 190, as shown in FIG. 9. In an alternative embodiment of the invention, the time strobe message 190 may be incorporated within an event message, a configuration message or a system message that includes information other than merely the content of a dedicated time strobe message 190. Each time strobe message 190 is manufactured by the record generator task 105, utilizing a time indication received from the timer logic 120.

Figure 10:
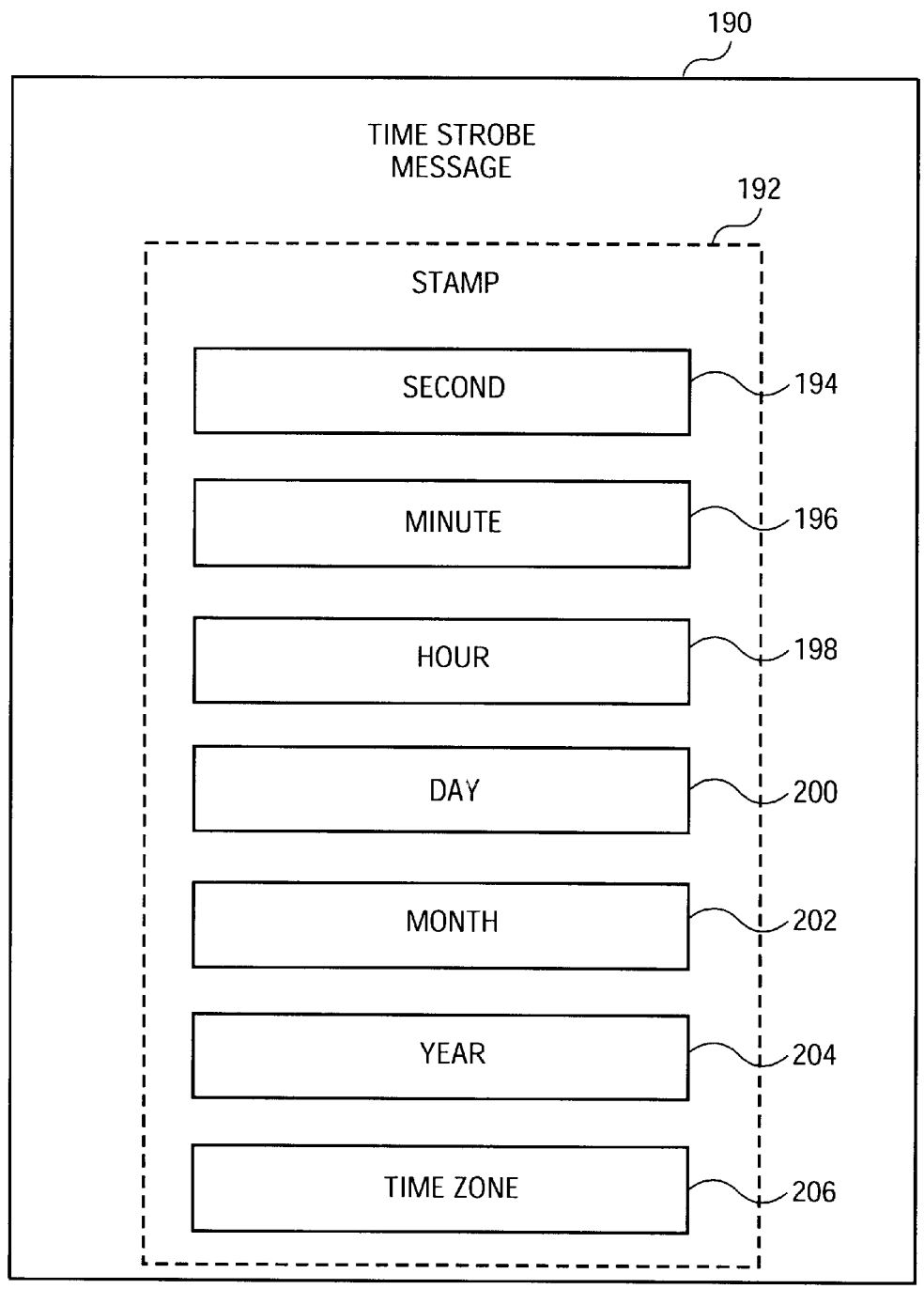
FIG. 10 is a diagrammatic representation of a time strobe message, according to an exemplary embodiment of the present invention.

The construction of exemplary time strobe message 190 is illustrated in FIG. 10. Specifically, the time strobe message 190 is shown to include a time stamp 192 that includes a number of fields, namely a second field 194, a minute field 196, an hour field 198, a day field 200, a month field 202, a year field 204 and a time zone field 206. The fields 194–206 together functions to provide a temporal reference, for communication to the event feed client 68, for the control and data messages 140 and 142 that are communicated to the client 68.

The record generator task 105 continually inserts time strobe messages 190 into the information stream 180 to indicate the expiration of predetermined and regular time intervals, as measured utilizing the timer logic 120, at the transaction processing system 102. In one exemplary embodiment of the present invention, the record generator task 105 inserts a time strobe message 190 into the instruction stream approximately every one minute. However, it will appreciated that where a higher resolution view is required, the record generator task 105 may insert a time strobe message 190 into the instruction stream 180 every second. Similarly, where a low-resolution view is sufficient, the record generator task 105 may insert a time strobe message 190 into the instruction stream 180 every 15 minutes.

The time information contained within a time strobe message 190 (e.g., the information recorded the fields 194–206) is expressed within the same time reference framework as the respective time stands 191 included within each of the control and data messages 140 and 142 also included within the instruction stream 180. Accordingly, two successive time strobe messages 190 within the instruction stream may be regarded as delimiting a predetermined time interval (or "time bucket") at the transaction processing system 102. Control and data messages 140 and 142 that are received between the reception of two successive time strobe messages 190 may accordingly be regarded as pertaining to events that occurred (or information that was determined) at a transaction processing system 102 in the predetermined time delimited by the two successive time strobe messages 190. Accordingly, a time strobe message 190 guarantees to an event feed client 68 that, subsequent to reception of the respective time strobe message 190, no further control or data messages 140 or 142 will be received at the client 68 that include a time stamp 191 indicating a time later than the time indicated by the received time strobe signal 190. Accordingly, the client side software 130 can be assured that no extra data relevant to a particular predetermined time interval will be received from the event feed server 70, and can then proceed to perform calculations on data pertaining to that predetermined time interval. For example, a data monitor 56, as illustrated in FIG. 6, may wish to count the number of calls received at an ACD within successive 15 minutes intervals of a day. By instituting a count of time strobe messages 190 (e.g., by counting 15 successive time strobe messages 190 issued by, the record generator 105 at the expiration of every minute on the ACD), the data monitor 56 is able to identify event messages indicating calls received at the ACD within a 15 minute interval identified using the successive time strobe messages 190. Similarly, a data monitor 56 may wish to aggregate (or assimilate) information contained in a number of control or data messages 140 or 142 generated by the ACD over a predetermined time. For example, the data monitor 56 may wish to construct a fact record indicating all configuration changes to the ACD over a three-hour time interval. Again, by counting the time strobe messages 190 received at the event feed client 68 from the event to server 70, a three-hour time interval (or window) can be identified, and configuration messages 146 received within that three-hour time interval may be aggregated or assimilated into a single fact record for propagation to the data engine 35.

Flowchart-Time Marking of Information Stream

Figure 11:
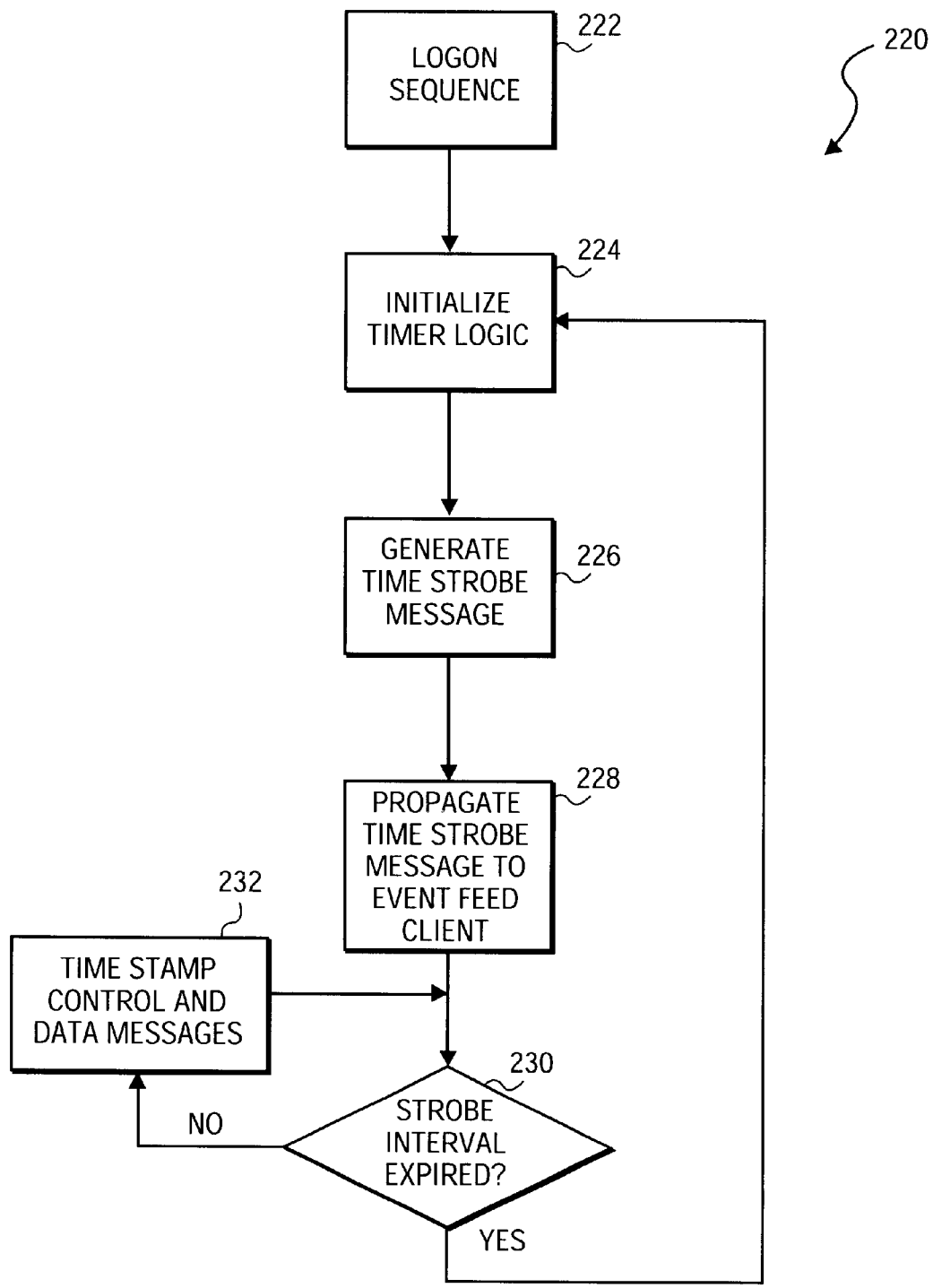
FIG. 11 is a flow chart illustrating a method, according to an exemplary embodiment of the present invention of time marking an information stream propagated between a detection entity that monitors a transaction processing system and a reporting entity.

FIG. 11 is a flowchart illustrating a method 220, according to an exemplary embodiment of the present invention, of time marking an information stream propagated between a detection entity (e.g., the server side software 100), that monitors a transaction processing system 102, and a reporting entity (e.g., the client side software 130). The method 220, in one embodiment, is performed primarily within the event feed server 70 illustrated in FIG. 5. After the performance of the logon sequence, as indicated at 222, with the event feed client 68 during the logon interval 186, the timer logic 120 is initialized at step 224. The record generator task 105, utilizing a clock signal (or other time indication) received from the timer logic 120, then generates a time strobe message 190 at step 226 after the timer logic 120 indicates the expiration of a predetermined time interval (e.g., one minute). It will be noted that the time reference framework is determined at the transaction processing system 102, and communicated to the information server 14. By establishing the time reference framework at the transaction processing system 102, it is ensured that an accurate correlation between the events and the times at which such event occurred is maintained. At step 228, the event feed server 70 propagates the generated time strobe message 190 to the associated event feed client 68 utilizing the transmit logic 126. At decision box 230, the record generator task 105 performs a determination as to whether a time strobe interval (e.g., one minute) has again expired. If not, the method then proceeds to step 232, where the record generator 105 time stamps the control and data messages 140 and 142 that of to be communicated to the event feed client. The method 220 then loops back to decision box 230, and cycles through the step 232 and the decision box 230 until it is determined at decision box 230 that the strobe interval has expired. Upon a determination that the strobe interval has expired, the method 220 then returns to step 226, where the next successive time strobe message 190 is generated by the record generator 105. Accordingly, two successive time strobe messages 190 demarcate a predetermined time interval, corresponding to the strobe interval, at the transaction processing system 102.

Flowcharts-Construction of Fact Record

Figure 12:
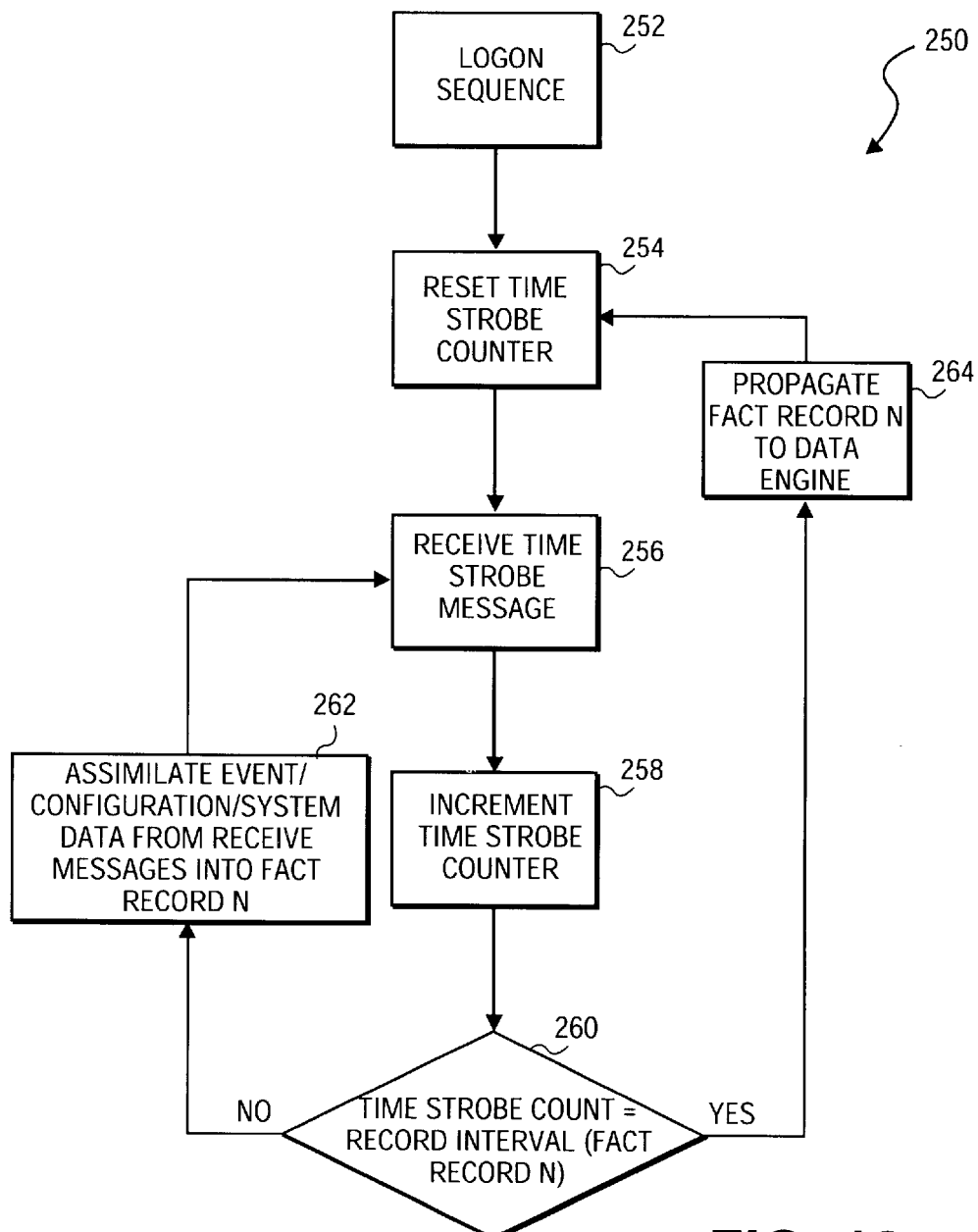
FIGS. 12 and 13 are flow charts illustrating alternative methods, according to exemplary embodiments of the present invention, of constructing a fact record at client side software utilizing information received within an instruction stream.
Figure 13:
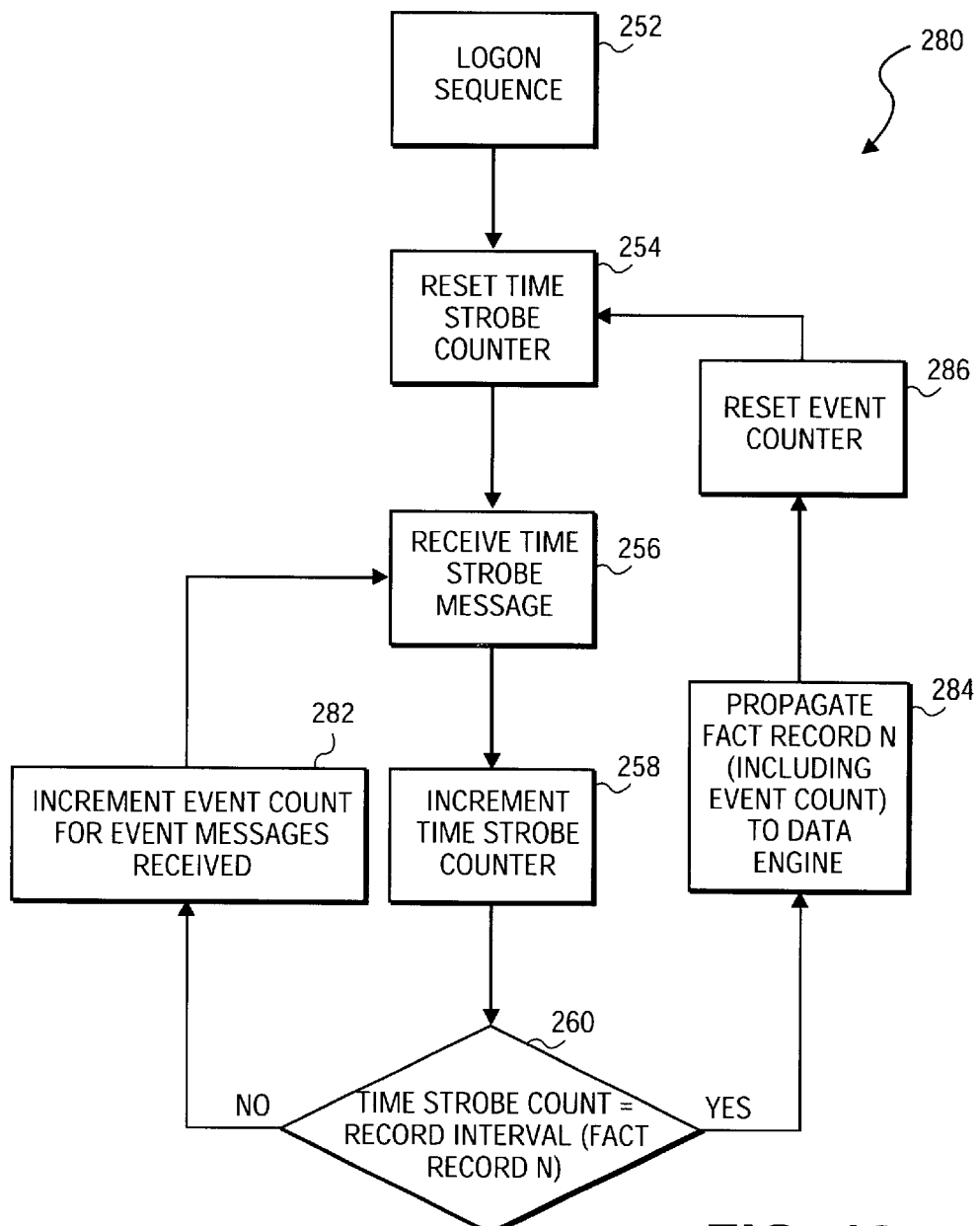

FIGS. 12 and 13 of flowcharts illustrating respective methods 250 and 280, according.to exemplary embodiments of the present invention, of constructing a fact record at the client side software 130 utilizing information received at the client side software 130 within the information stream 180. Turning first to FIG. 12, subsequent to the performance of the logon sequence, as indicated 252, with the event feed server 70 during the logon interval 186, the data monitor 56 resets a time strobe counter 300, illustrated in FIG. 6, at step 254. At step 256, the event feed client 68 receives a time strobe message 190, as generated by the record generator 105. The event feed client 68 informs the data monitor 56 of receipt of the time strobe message 190, responsive to which the data monitor 56, at 258, increments a time strobe count value contained within the time strobe counter 300. At decision box 235, the data monitor 56 compares the current time strobe count value to a record interval value 302 for a specific fact record 132. Specifically, for each type of fact record 132 generated by the data monitor 56, a record interval value 302 may be maintained by the data monitor 56, this record interval value 302 for the fact record 132 indicating the number of time strobe messages 190 that should be received before the fact record 132 is completed, and ready for propagation to the data engine 35. Accordingly, the record interval value 302 for each fact record 132 specifies a time interval (or window) at the transaction processing system 102 on which the fact record 132 reports. If it is determined at decision box 235 that the time strobe count value contained within the time strobe counter 300 is less than the record interval value 302 for a relevant fact record 132, the method 250 proceeds to step 237, and will continue to assimilated, aggregate, or summarize information contained in control or data messages 140 or 142, as appropriate, into the relevant fact record 132. For example, a specific fact record 132 may be generated to indicate the total idle time of a particular agent serviced by ACD within each successive 15 minutes interval. At step 237, the data monitor 56 may thus assimilated any idle time information included within an agent event message 150 into the relevant fact record 132. Following completion of step 237, the method 250 loops back to step 256, to process receipt of a next time strobe message 190.

On the other hand, should it be determined that decision box 235 that the time strobe count value, as contained within the time strobe counter 300, does not in fact equal a record interval value 302, the method 250 proceeds to step 264, where the data monitor 56 then registers that the fact record 132, for the reporting interval, is completed. The data monitor 56 then proceeds to propagate the relevant fact record 132 to the data engine 35. The time strobe counter 300 is then reset at step 254.

The method 280 shown in FIG. 13 is similar to the method 250 shown in FIG. 12, but differs in that, as opposed to assimilating, aggregating or summarizing information for inclusion within the fact record 132, the number of data messages 142 indicating a predetermined event on the transaction processing system are simply counted by an event counter 304 within the data monitor 56. Accordingly, at step 282, responsive to a determination at decision box 235 that a reporting interval has not completed, the method 280 increments the event counter 304 upon receipt of a data message indicating a specific event type of relevance to a specific fact record 132. Upon completion of the step 282, the method 280 loops back to step 256, where receipt of the next time strobe message 190 is processed. Alternatively, should it be determined at decision box 235 that the reporting interval has been fact expired (i.e., when the time strobe count within the time strobe counter 300 equals a specific record interval value 302 for a specific and relevant fact record 132), the method 280 then proceeds to step 284, where a fact record 132 including an event count value derived from the event counter 304, is propagated to the data engine 35. At step 286, the event counter 304 is then reset, whereafter the time strobe counter 300 is reset at step 254.

Computer System

Figure 14:
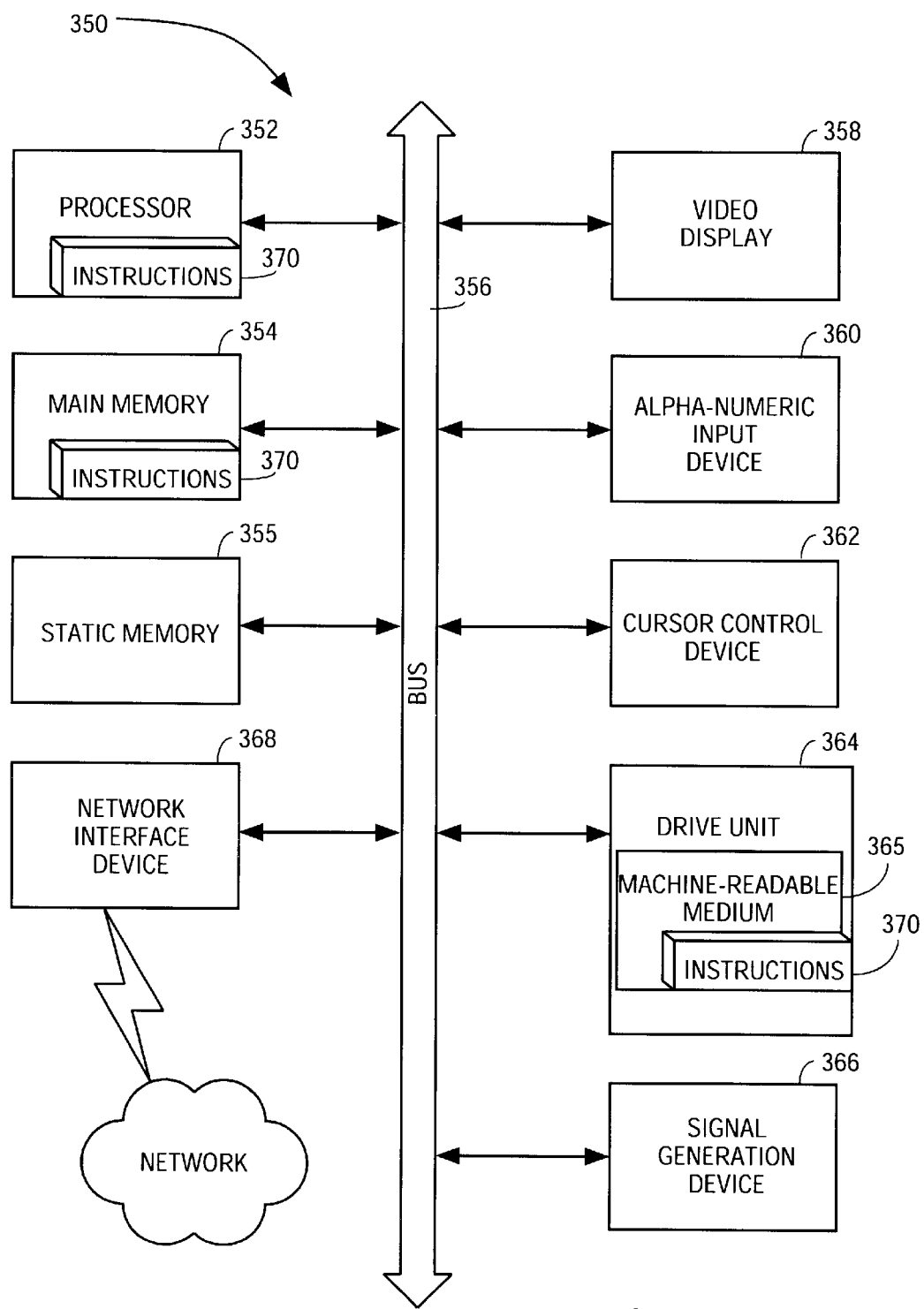
FIG. 14 is a diagrammatic representation of a machine, in an exemplary form of a computer system within a set of instruction, for causing the machine to perform any of the methodologies of the present invention, may be executed.

FIG. 14 shows a diagrammatic representation of machine (e.g., a transaction processing system) in the exemplary form of a computer system 350 within which a set of instructions for causing the machine to perform any one of the methodologies discussed above, may be executed. The computer system 350 includes a processor 352, a main memory 354 and a static memory 355, which communicate with each other via a bus 356. The computer system 350 is further shown to include a video display unit 358 (e.g., a liquid crystal display (LCD) or a cathode ray tube (CRT)). The computer system 350 also includes an alpha-numeric input device 360 (e.g., a keyboard), a cursor control device 362 (e.g., a mouse), a disk drive unit 364, a signal generation device 366 (e.g., a speaker) and a network interface device 368. The disk drive unit 364 includes a machine-readable medium 365 on which is stored a set of instructions (i.e., software) 370 embodying any one, or all, of the methodologies described above. The software 370 is also shown to reside, completely or at least partially, within the main memory 353 and/or within the processor 352. The software 370 may further be transmitted or received via the network interface device 368. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and apparatus for generating a record from a time-marked information stream have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of constructing a record utilizing an information stream propagated between a detection entity, that monitors a transaction processing system, and a reporting entity, the method comprising:

detecting an expiration of a predetermined time interval with respect to the detection entity;

inserting first and second time delimiters into the information stream propagated between the detection entity and the reporting entity, the time delimiters indicating the expiration of the predetermined time interval; and assimilating information into the record at the reporting entity utilizing the time delimiters, and wherein the assimilating of the information comprises collecting information contained in a plurality of messages that are included in the information stream between the first and second time delimiters.

2. The method of claim 1 including inserting a plurality of time delimiters into the information stream, each of the time delimiters being inserted after each successive expiration of the predetermined time interval.

3. The method of claim 1 wherein the first and second time delimiters delimit a predetermined time period with respect to the transaction processing system.

4. The method of claim 1 wherein the first and second time delimiters are not successive time delimiters within the information stream.

5. The method of claim 1 wherein the assimilating of the information comprises counting a number of event messages, within the information stream, that indicate the occurrence of a predetermined event type with respect to the transaction processing system monitored by the detection entity, and that are included within the information stream between the first and second time delimiters.

6. The method of claim 5 including generating the record to include a count of the number of the event messages, within the information stream, that indicated the occurrence of the predetermined event type with respect to the transaction processing system monitored by the detection entity, and that are included within the information stream between the first and second time delimiters.

7. The method of claim 1 wherein the assimilating of information comprises summarizing information contained in a plurality of messages that are included within the information stream between the first and second time delimiters.

8. The method of claim 1 including generating a composite record utilizing the collected information.

9. The method of claim 8 including propagating the composite record to a database.

10. The method of claim 1 wherein the time delimiter comprises a dedicated message inserted into the information stream.

11. The method of claim 1 wherein the time delimiter is incorporated within a shared message within the information stream, the shared message including system information generated by the detection entity pertaining to the transaction processing system.

12. The method of claim 1 wherein the information stream includes an event-generated message, generated by the detection entity responsive to the detection of an event occurrence on the transaction processing system monitored by the detection entity, the method including incorporating a time indication within the event-generated message indicative of a time at which the event occurrence was detected.

13. The method of claim 1 wherein the information stream includes a configuration message, generated by the detection entity responsive to a configuration change relating to the transaction processing system monitored by the detection entity, the method including incorporating a time indication within the configuration message indicative of a time at which the configuration change was detected.

14. The method of claim 1 wherein the information stream includes a system message, generated by the detection entity to provide system information to the reporting entity, the method including incorporating a time indication within the system message.

15. The method of claim 14 wherein the time delimiter comprises a system message.

16. A method of time marking an information stream propagated between a detection entity, that monitors a transaction processing system, and a reporting entity, the method comprising:

detecting expirations of predetermined and regular time intervals with respect to the transaction processing system; and inserting time delimiters into the information stream propagated between the detection entity and the reporting entity, each time delimiter indicating the expiration of a predetermined and regular time interval with respect to the transaction processing system, wherein each time delimiter is incorporated into a shared message within the information stream, the shared message including system information generated by the detection entity pertaining to the transaction processing system.

17. The method of claim 16 wherein each timer delimiter comprises a dedicated message inserted into the information stream.

18. The method of claim 16 wherein the information stream includes an event-generated message, generated by the detection entity responsive to the detection of an event occurrence on the transaction processing system monitored by the detection entity, the method including incorporating a time indication within the event-generated message indicative of a time at which the event occurrence was detected.

19. The method of claim 16 wherein the information stream includes a configuration message, generated by the detection entity responsive to a configuration change relating to the transaction processing system monitored by the detection entity, the method including incorporating a time indication within the configuration message indicative of a time at which the configuration change was detected.

20. The method of claim 16 wherein the information stream includes a system message, generated by the detection entity to provide system information to the reporting entity, the method including incorporating a time indication within the system message.

21. The method of claim 16 wherein the regular and predetermined time intervals each comprises a time interval of between one second and five minutes.

22. The method of claim 21 wherein the regular and predetermined time intervals each comprises a time interval of approximately one minute.

23. A method of time marking an information stream propagated between a detection entity and a reporting entity, the method including:

measuring a predetermined time interval with respect to the detection entity;,and time marking the information stream propagated between the detection entity and the reporting entity, the time marking indicating the expiration of the predetermined time interval with respect to the detection entity, wherein the information stream is time marked using a time delimiter incorporated into a shared message, the shared message including system information generated by the detection entity and pertaining to a transaction processing system.

24. A method of constructing a record utilizing an information stream propagated between a detection entity, that monitors a transaction processing system, and a reporting entity, the method comprising:

receiving first and second time delimiters within the information stream propagated between the detection entity and the reporting entity, the time delimiters indicating expiration of a predetermined time interval with respect to the transaction processing system; and assimilating information into the record at the reporting entity utilizing the time delimiters, and wherein the assimilating of the information comprises collecting information contained in a plurality of messages that are included in the information stream between the first and second time delimiters.

25. The method of claim including receiving a plurality of time delimiters within the information stream, each of the time delimiters indicating the expiration of the predetermined time interval with respect to the transaction processing system.

26. The method of claim 25 wherein the first and second time delimiters delimit a predetermined time period with respect to the transaction processing system.

27. The method of claim 26 wherein the first and second time delimiters are not successive time delimiters within the information stream.

28. The method of claim 26 wherein the assimilating of the information comprises counting a number of event messages, within the information stream, that indicate the occurrence of a predetermined event type with respect to the transaction processing system monitored by the detection entity, and that are included within the information stream between the first and second time delimiters.

29. The method of claim 28 including generating the record to include a count of the number of the event messages, within the information stream, that indicated the occurrence of the predetermined event type with respect to the transaction processing system monitored by the detection entity, and that are included within the information stream between the first and second time delimiters.

30. The method of claim 24 wherein the assimilating of information comprises summarizing information contained in a plurality of messages that are included within the information stream between the first and second time delimiters.

31. The method of claim 24 including generating a composite record utilizing the collected information.

32. The method of claim 31 including propagating the composite record to a database.

33. The method of claim 24 wherein the time delimiter comprises a dedicated message inserted into the information stream.

34. The method of claim 24 wherein the time delimiter is incorporated within a shared message within the information stream, the shared message including information generated by the detection entity pertaining to the transaction processing system.

35. The method of claim 24 wherein the information stream includes an event-generated message, generated by the detection entity responsive to the detection of an event occurrence on the transaction processing system monitored by the detection entity, the method including incorporating a time indication within the event-generated message indicative of a time at which the event occurrence was detected.

36. The method of claim 24 wherein the information stream includes a configuration message, generated by the detection entity responsive to a configuration change relating to the transaction processing system monitored by the detection entity, the method including incorporating a time indication within the configuration message indicative of a time at which the configuration change was detected.

37. The method of claim 24 wherein the information stream includes a system message, generated by the detection entity to provide system information to the reporting entity, the method including incorporating a time indication within the system message.

38. The method of claim 37 wherein the time delimiter comprises a system message.

39. A machine-readable medium including a sequence of instructions that, when executed by a machine, cause the machine to perform the steps of:

detecting expirations of predetermined and regular time intervals with respect to a transaction processing system; and inserting time delimiters into the information stream propagated to a reporting entity, each time delimiter indicating the expiration of a predetermined and regular time interval with respect to the transaction processing system and comprising a system message.

40. A machine-readable medium including a sequence of instructions that, when executed by machine, cause the machine to perform the steps of:

receiving first and second time delimiters within the information stream propagated between a detection entity, that monitors a transaction processing system, and a reporting entity, the time delimiters indicating the expiration of the predetermined time interval with respect to the transaction processing system; and assimilating information into a record at the reporting entity utilizing the time delimiters, and wherein the assimilating of the information comprises collecting information contained in a plurality of messages that are included in the information stream between the first and second time delimiters.

41. A detection entity for marking an information stream propagated between the detection entity, that monitors a transaction processing system, and a reporting entity, the detection entity comprising:

a timer to detect expirations of predetermined and regular time intervals with respect to the transaction processing system; and strobing logic to insert time delimiters into the information stream propagated between the detection entity and the reporting entity, each time delimiter indicating the expiration of a predetermined and regular time interval with respect to the transaction processing system and wherein the strobing logic incorporates a time strobing indication into an information message that includes information pertaining to the transaction processing system, and inserts the information message into the information stream.

42. The detection entity of claim 41 wherein the strobing logic inserts a dedicated time strobe message into the information stream.

43. The detection entity of claim 41 wherein the detection entity includes event logic to insert an event-generated message, generated by the event logic responsive to an event within the transaction processing system monitored by the detection entity, into the information stream, the event-generated message including a time indication indicative of a time at which the event occurred.

44. The detection entity of claim 41 wherein the detection entity includes configuration logic to insert a configuration message, generated by the configuration logic responsive to a configuration change relating to the transaction processing system monitored by the detection entity, into the information stream, the configuration message including a time indication indicative of a time at which the configuration change occurred.

45. The detection entity of claim 41 wherein the detection entity includes system logic to insert a system message, generated by the system logic to provide system information to the reporting entity into the information stream, the system message including a time indication.

46. The detection entity of claim 45 wherein the time delimiter comprises a system message.

47. The detection entity of claim 41 wherein the regular and predetermined time intervals each comprises a time interval of between one second and five minutes.

48. The detection entity of claim 47 wherein the regular and predetermined time intervals each comprises a time interval of approximately one minute.

49. A detection entity for marking an information stream propagated from the detection entity, that monitors a transaction processing system, to a reporting entity, the detection entity comprising:

timing means for detecting expirations of predetermined and regular time intervals with respect to the transaction processing system; and strobing means for inserting time delimiters into the information stream propagated between the detection entity and the reporting entity, each time delimiter indicating the expiration of a predetermined and regular time interval with respect to the transaction processing system and wherein the strobing means incorporates a time strobing indication into an information message that includes information pertaining to the transaction processing system, and inserts the information message into the information stream.

50. A reporting entity for constructing a record utilizing an information stream received from a detection entity, that monitors a transaction processing system, the reporting entity comprising:

a receiver to receive first and second time delimiters within the information stream propagated between the detection entity and the reporting entity, the time delimiters indicating the expiration of the predetermined time interval with respect to the transaction processing system; and an assimilator to assimilate information into the record utilizing the time delimiters, and wherein the assimilator collects information contained in a plurality of messages that are included in the information stream between the first and second time delimiters.

51. The reporting entity of claim 50 wherein the receiver is to receive a plurality of time delimiters within the information stream, each of the time delimiters indicating the expiration of the predetermined and regular time interval with respect to the transaction processing system.

52. The reporting entity of claim 51 wherein the first and second time delimiters delimit a predetermined time period with respect to the transaction processing system.

53. The reporting entity of claim 52 wherein the first and second time delimiters are not successive time delimiters within the information stream.

54. The reporting entity of claim 52 wherein the assimilator counts a number of event messages, within the information stream, that indicated the occurrence of a predetermined event type with respect to the transaction processing system monitored by the detection entity, and that are included within the information stream between the first and second time delimiters.

55. The reporting entity of claim 54 wherein the assimilator generates the record to include a count of the number of the event messages, within the information stream, that indicated the occurrence of the predetermined event type with respect to the transaction processing system monitored by the detection entity, and that are included within the information stream between the first and second time delimiters.

56. The reporting entity of claim 50 wherein the assimilator summarizes information contained in a plurality of messages that are included within the information stream between the first and second time delimiters.

57. A reporting entity for constructing a record utilizing an information stream received from a detection entity, that monitors a transaction processing system, the reporting entity comprising:

receiver means for receiving first and second time delimiters within the information stream propagated between the detection entity and the reporting entity, the time delimiters indicating the expiration of the predetermined time interval with respect to the transaction processing system; and assimilator means for assimilating information into the record utilizing the time delimiters, and wherein the assimilator means collects information contained in a plurality of messages that are included in the information stream between the first and second time delimiters.

\* \* \* \* \*

UNITED STATES PATENT AND TRADEMARK OFFICE
CERTIFICATE OF CORRECTION

PATENT NO. : 6,598,078 B1
DATED : July 22, 2003
INVENTOR(S) : Ehrlich et al.

It is certified that error appears in the above-identified patent and that said Letters Patent is hereby corrected as shown below:

Column 2,
Lines 53 and 55, after "environmental", insert -- 10 --.

Signed and Sealed this

Thirteenth Day of January, 2004

JON W. DUDAS
*Acting Director of the United States Patent and Trademark Office*